United States Patent [19]

Horvath

[11] Patent Number: 4,581,790
[45] Date of Patent: Apr. 15, 1986

[54] PORTABLE SMALL GAME HOLDER

[76] Inventor: Julius Horvath, 1059 Waltham, S.E., Grand Rapids, Mich. 49506

[21] Appl. No.: 721,084

[22] Filed: Apr. 8, 1985

[51] Int. Cl.$^4$ .............................................. A22B 1/00
[52] U.S. Cl. ...................................... 17/44.2; 294/79
[58] Field of Search ................ 17/44, 44.1, 44.2, 44.4; 294/79

[56] References Cited

U.S. PATENT DOCUMENTS

| | | | |
|---|---|---|---|
| 671,900 | 4/1901 | Stanart | 17/44.1 |
| 892,719 | 7/1908 | Gratton | 17/44.2 X |
| 1,033,223 | 7/1912 | Wilson | 17/44.2 X |
| 1,189,966 | 7/1916 | Kellogg | 17/44 |
| 1,505,665 | 8/1924 | Paice | 294/79 |
| 3,137,030 | 6/1964 | Varner | 17/44.2 |
| 3,188,130 | 6/1965 | Petrowicz | 17/44 X |
| 3,568,243 | 3/1971 | Hines | 17/44.2 |
| 3,570,049 | 3/1971 | Muckelrath | 17/44.2 |
| 3,623,187 | 11/1971 | Grubbs | 17/44.2 X |
| 4,027,357 | 6/1977 | Morris | 17/44 |
| 4,094,041 | 6/1978 | Steed | 17/44.2 |
| 4,425,678 | 6/1984 | Pepper | 17/44 |

Primary Examiner—Willie G. Abercrombie
Attorney, Agent, or Firm—John A. Waters

[57] ABSTRACT

A portable small game holder for dressing game in the field having two flat rectangular plate arms joined by a hinge, with the outer ends of the arms containing an inwardly extending U-shaped slot into which the legs of the animal are fitted. The holder is hung on a tree limb or any other suitable support by means of a hook, the opposite end of which serves as the hingepin. When fully opened, the arms engage each other immediately below the axis of the hingepin before the arms reach a horizontal position.

7 Claims, 4 Drawing Figures

PORTABLE SMALL GAME HOLDER

BACKGROUND OF THE INVENTION

This invention relates to a portable small game holder for the cleaning and dressing of small game in the field.

At present, there are numerous devices available which are designed to hang animals in a manner to facilitate the cleaning, dressing, or skinning thereof. These devices generally employ rope nooses or hooks inserted into the animal's limbs to suspend the animal and to hold it in place. The rope noose holders tend to become tangled while being carried in the field, while the hook devices can cause injury to the person who is carrying it. All of the present devices are bulky and heavy, which limits their usefulness in the field.

SUMMARY OF THE INVENTION

In accordance with the present invention, a portable small game holder for dressing small game animals comprises a pair of arms having inner and outer ends, the inner ends being adjacent each other and the outer ends extending outwardly therefrom. The outer ends have inwardly extending slots therein, each slot being wide enough to permit the leg of an animal to fit in the slot but being too narrow to permit the lower joint in the animal's leg from fitting downwardly through the slot. The inner ends of the slots can be enlarged to further lock the legs in the slots. A hinge mechanism interconnects the inner ends of the arms for pivotal movement about a transverse hinge axis, the hinge mechanism including a transverse hingepin retained in transverse mating hingepin openings positioned at the inner ends of the arms. Stop members on the inner ends of the arms come into abutting engagement with each other and prevent further downward pivotal movement of the arms after the arms have been pivoted downwardly to a fully opened position wherein the slots are pivoted downwardly no further than a substantially horizontal position. A hook mechanism for suspending the small game holder from a tree branch or the like includes a downwardly facing hook positioned above the inner ends of the arms, a vertical support member extending downwardly from the hook to a side edge of the junction between the inner ends of the arms, and a horizontal leg that extends outwardly from the bottom of the support member through the transverse hingepin openings. The horizontal leg serves as the hingepin of the hinge means. The arms are foldable upwardly and flat against the hook means for transportation and storage.

The arms of the present invention comprise flat plates having flat, opposed inner ends. The hinge comprises hinge members mounted on the inner ends of the plates with mating looped ends providing the transverse hingepin openings and hinge axis at a position above the junction between the inner ends of the plates. The plates are pivotable upwardly until they lie flat against the hook means but the inner ends of the plates engage each other and prevent further downward movement of the plates at the point where the slots are still inclined no further downwardly than a horizontal position and preferably are still upwardly inclined.

The hook of the present invention is formed from a single segment of wire rod, with the hook being bent downwardly from the top of the support member and the horizontal leg being bent upwardly from the lower end of the support member, the outer end of the horizontal leg being deformed to hold the horizontal leg in the hinge openings.

A portion of the transverse mating hingepin openings are flattened such that the arms snap into their fully opened position.

In an alternate embodiment, the inner ends of the arms may have a downwardly extending flanged portion. When the holder is opened, the flanges come into contact, thus providing a larger area of contact for added strength.

One advantage of the present invention is its lightweight but sturdy construction. It can further be folded for easy carrying in the field. It also contains a minimum number of moving parts which could become fouled.

Another advantage of the invention is the use of the inwardly extending slots to hold the animal rather than hooks or rope nooses, both of which can become entangled in a hunter's clothing.

These and other advantages of the present invention will hereinafter appear, and for purposes of illustration but not of limitation, a preferred embodiment of the present invention is described in detail below and shown in the appended drawings.

DETAILED DESCRIPTION OF THE PREFERRED EMBODIMENT

Figure 4:
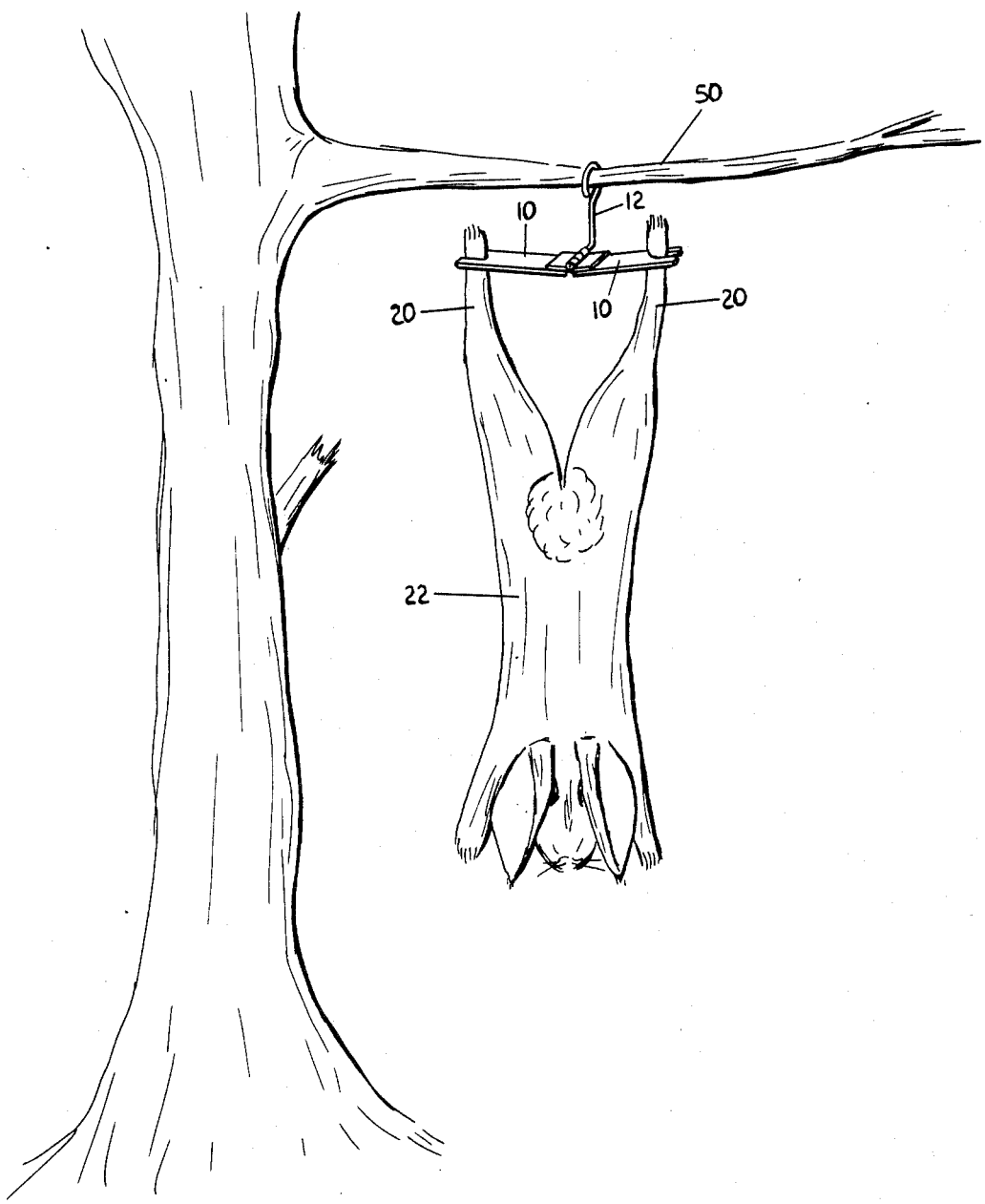
FIG. 4 is a perspective view of the holder shown in operating position supporting an animal from a tree in the field.

Referring now in detail to the drawings, the arms 10 of the holder are made from flat rectangular plates. At the outer end of each arm, an inwardly extending U-shaped slot 18 is located. The slot is wide enough to accommodate the legs 20 of a small game animal 22, but not wide enough to allow the joint of the animal's leg to pass therethrough, such that when a leg 20 is inserted therein, a joint on the leg will come to rest against the upper surface of the arm 10, thereby suspending the animal 22 as shown in FIG. 4. For added stability, the inner end 28 of slot 18 is slightly enlarged so that it accommodates a small portion of the joint, thereby preventing any outward lateral movement of the animal's legs 20.

Permanently affixed to inner ends 21 of the arms 10 are opposing hinge members 24, 26. The hinge members comprise flat plates welded respectively to the upper surfaces of each arm 10 with transverse mating looped ends 30 and 32 positioned at the junction between the inner ends 21 of arms 10, to serve as hingepin openings. A horizontally extending lower leg 16 of a supporting hook 12 is inserted through the circular openings in the looped ends 30, 32 of hinge members 24, 26 to serve as a hingepin for the hinge. The outer end of leg 16 can be flattened somewhat to hold the hingepin in the hinge.

Hook 12 also comprises a support member 33 extending upwardly from an end of leg 16, with a downwardly facing curved hook 35 extending over the center of the arms 10 at the top of hook 12. Hook member 12 desirably is formed out of a single piece of wire rod.

Figure 3:
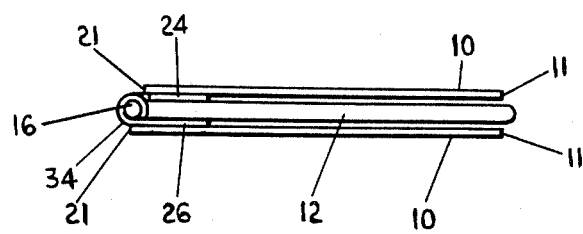
FIG. 3 is a side view of the holder in its folded position.

When not in use, the holder can be folded as shown in FIG. 3 to easily fit into a hunter's pocket. In operation, the arms 10 are rotated downwardly about the axis of hingepin 16. The inner ends 21 of arms 10 come into abutting engagement immediately below the pivot axis of hingepin 16 while the arms 10 (or at least the slotted outer end portion of the arms) are pivoted no further downwardly than a horizontal position. Preferably the slots are still slightly upwardly inclined so that the weight of the animal causes the animal's legs 20 to be urged inwardly into slots 18 while being held. The looped ends 30, 32 of hinge members 24, 26, may have a slightly flattened portion 34 below the pivot axis of hingepin 16 so that the arms 10 snap into their opened positions, thus providing additional stability. When opened, hook 35 is placed around a tree limb 50 or any other suitable support, the arms 10 are rotated downwardly, and the animal's legs 20 are inserted in slots 18, thereby suspending the animal 22 in a manner readily accessible to being field dressed, as shown in FIG. 4.

Figure 1:
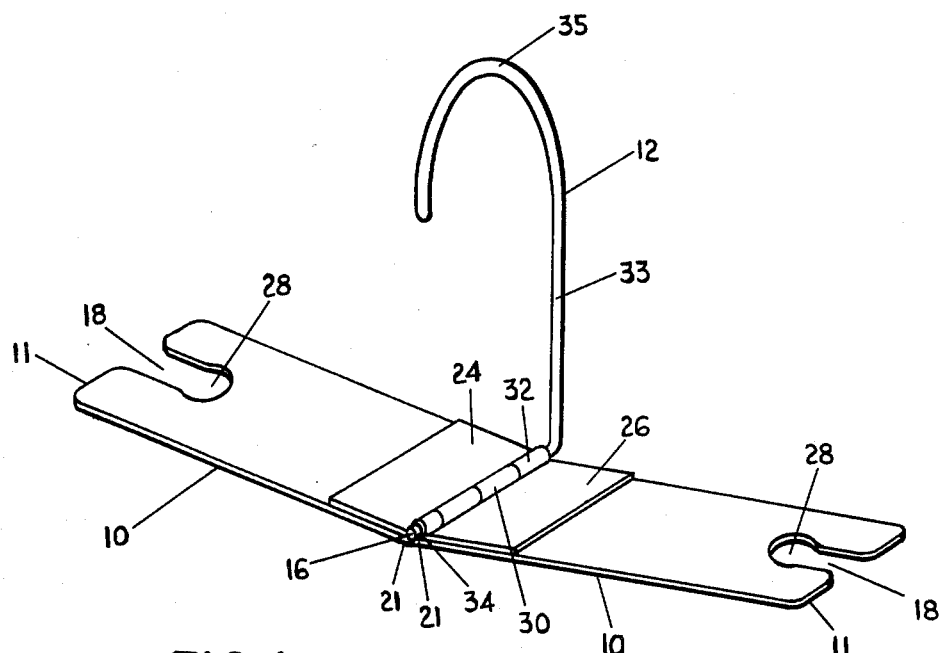
FIG. 1 is a perspective view of the holder.
Figure 2:
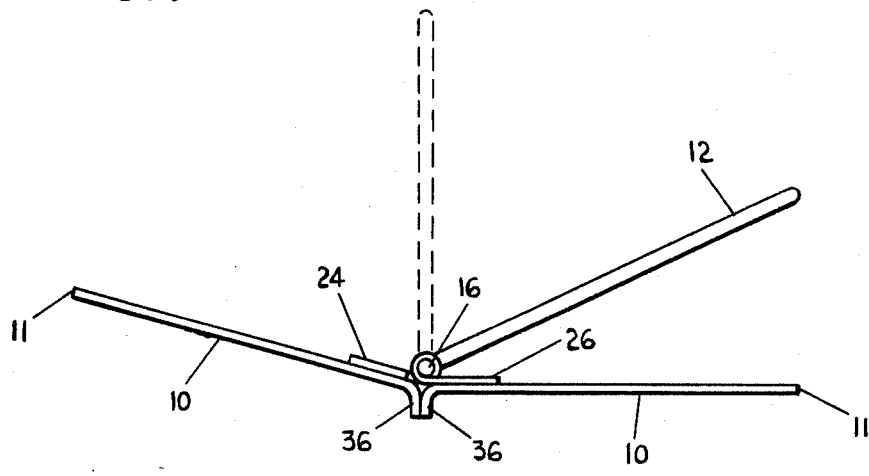
FIG. 2 is a side view of an alternate embodiment showing flanged plates.

FIG. 2 shows an alternate embodiment employing downwardly protruding flanges 36 on the inner ends 21 of arms 10 below the hinge members 24, 26. When the arms 10 are rotated downwardly, the flanges 36 come into engagement below the pivot axis of leg 16 enhancing the abutting surfaces at the inner ends 21 of arms 10 that serve to limit the downward rotation of arms 10 to the slightly upwardly inclined position shown. The flanges 36 eliminate the possibility that the inner edges 21 of the arms 10 will become misaligned and slip past each other. The angle between the flange 36 and the rest of arm 10 can be varied to change the angle at which the arms 10 come together when the holder is fully opened. The arms 10 could be opened a full 180° but the slight upward incline improves the holding action of the arms on the animal's legs.

It should be understood that the foregoing embodiments are merely illustrative of the preferred practice of the present invention and that various modifications and changes may be made in the arrangements and details of construction of the embodiments shown herein without departing from the spirit and scope of the present invention.

I claim:

1. A portable small game holder for dressing small game animals comprises:
   a pair of arms having inner and outer ends, the inner ends being adjacent each other and the outer ends extending outwardly therefrom, the outer ends having inwardly extending slots therein, each slot being wide enough to permit the leg of an animal to fit in the slot but being too narrow to permit the lower joint in the animal's leg from fitting downwardly through the slot;
   hinge means for interconnecting the inner ends of the arms for pivotal movement about a transverse hinge axis, the hinge means including a transverse hingepin retained in transverse mating hingepin openings positioned at the inner ends of the arms;
   stop members on the inner ends of the arms that come into abutting engagement with each other and prevent further downward pivotal movement of the arms after the arms have been pivoted downwardly to a fully opened position wherein the slots are pivoted downwardly no further than a substantially horizontal position; and
   hook means for suspending the small game holder from a tree branch or the like, said hook means including a downwardly facing hook positioned above the inner ends of the arms, a vertical support member extending downwardly from the hook to a side edge of the junction between the inner ends of the arms, and a horizontal leg that extends outwardly from the bottom of the support member through the transverse hingepin openings, the horizontal leg serving as the hingepin of the hinge means, the arms being foldable upwardly and flat against the hook means for transportation and storage.

2. A portable small game holder according to claim 1 wherein the arms comprise flat plates having flat, opposed inner ends, the hinge means comprising hinge members mounted on the inner ends of the plates with mating looped ends providing the transverse hingepin openings and hinge axis at a position above the junction between the inner ends of the plates, the plates being pivotable upwardly until they lie flat against the hook means but the inner ends of the plates engaging each other and preventing further downward movement of the plates at the point where the slots are still inclined no further downwardly than a horizontal position.

3. A portable small game holder according to claim 2 wherein the inner ends of the arms come into engagement to prevent further downward movement of the arms at a point where the slots in the outer ends of the arms are still upwardly inclined.

4. A portable small game holder according to claim 1 wherein the hook means is formed from a single segment of wire rod, with the hook being bent downwardly from the top of the support member and the horizontal leg being bent upwardly from the lower end of the support member, the outer end of the horizontal leg being deformed to hold the horizontal leg in the hinge openings.

5. A portable small game holder according to claim 1 wherein the inner end of the slot includes an enlarged portion that is wider than the remainder of the slot, the enlarged portion permitting the leg joint of the animal to fit partially into the slot so as to prevent the leg from sliding out of the slot.

6. A portable small game holder according to claim 1 wherein a portion of the transverse mating hingepin openings are flattened such that the arms snap into their fully opened position.

7. A portable small game holder according to claim 1 wherein the inner ends of the plates include downwardly extending flanges, the flanges being positioned to come into abutting engagement with each other to limit downward movement of the plates when the holder is fully opened.

* * * * *